United States Patent
Mongeau et al.

(10) Patent No.: US 7,990,015 B2
(45) Date of Patent: Aug. 2, 2011

(54) POLE TIP ATTACHMENT FOR A MAGNETIC STRUCTURE

(75) Inventors: Peter P. Mongeau, Westborough, MA (US); Mark S. Piercey, Sudbury, MA (US); William R. Wink, Eastford, CT (US)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/080,945

(22) Filed: Apr. 7, 2008

(65) Prior Publication Data

US 2009/0026875 A1   Jan. 29, 2009

Related U.S. Application Data

(60) Provisional application No. 60/922,266, filed on Apr. 6, 2007.

(51) Int. Cl.
*H02K 1/18* (2006.01)
*H02K 1/16* (2006.01)
*H02K 1/14* (2006.01)

(52) U.S. Cl. ... 310/216.091; 310/216.093; 310/216.094; 310/216.099; 310/214; 310/216.098; 310/216.097; 310/216.088

(58) Field of Classification Search ............ 310/214, 310/216.088, 216.135, 194, 216.091–216.099; H02K 1/18, 1/14, 1/16

See application file for complete search history.

(56) References Cited

U.S. PATENT DOCUMENTS

| | | | |
|---|---|---|---|
| 1,042,408 A | 10/1912 | Dearborn | |
| 2,190,887 A | 2/1940 | Schaeren | |
| 2,562,254 A | 7/1951 | Andrus | |
| 2,736,829 A * | 2/1956 | Sills | 310/216.098 |
| 3,766,417 A | 10/1973 | Hallenbeck | |
| 3,898,491 A | 8/1975 | Long et al. | |
| 4,990,810 A | 2/1991 | Newhouse | |
| 5,949,172 A | 9/1999 | Katagiri | |
| 6,225,723 B1 | 5/2001 | Cooper et al. | |
| 6,611,076 B2 | 8/2003 | Lindbery et al. | |
| 2004/0021393 A1* | 2/2004 | Suzuki et al. | 310/218 |
| 2006/0022550 A1* | 2/2006 | Otsuji | 310/216 |
| 2007/0252471 A1* | 11/2007 | Holmes et al. | 310/218 |

FOREIGN PATENT DOCUMENTS

| | | | |
|---|---|---|---|
| JP | 2004215476 | * | 7/2004 |
| JP | 2004320824 | * | 11/2004 |
| JP | 2005045953 | * | 2/2005 |

* cited by examiner

*Primary Examiner* — Quyen Leung
*Assistant Examiner* — Terrance Kenerly
(74) *Attorney, Agent, or Firm* — Kriegsman & Kriegsman

(57) ABSTRACT

Attachments are removably coupled to the magnetic core of a rotating electric machine, the magnetic core being shaped to include a plurality of coil-receiving slots that are separated by radial teeth. Each attachment is constructed as a unitary member and includes a base and a stem, the stem being dimensioned for fitted insertion within a recess formed in the distal end of a corresponding tooth. The base includes a convex bottom wall, a flattened top wall and a pair of non-planar sidewalls. The stem is integrally formed on the top wall of the base and includes a front end, a rear end, a flattened top wall and a pair of opposing sidewalls. A longitudinal groove is formed into each of the pair of opposing sidewalls of the stem. An outwardly protruding shoulder designed for engagement by a retention plate is formed into the front and rear ends of the stem.

17 Claims, 8 Drawing Sheets

POLE TIP ATTACHMENT FOR A MAGNETIC STRUCTURE

CROSS-REFERENCE TO RELATED APPLICATIONS

The present application claims the benefit under 35 U.S.C. 119(e) of U.S. provisional Patent Application Ser. No. 60/922,266, filed Apr. 6, 2007, the disclosure of which is incorporated herein by reference.

BACKGROUND OF THE INVENTION

The present invention relates generally to rotating electric machines, such as high speed generators and motors, and more particularly to magnetic structures used in rotating electric machines which are shaped to include a plurality of coil-retaining slots that are separated by radial teeth.

In rotating electric machines, such as high speed generators and motors, groups of interconnected conductive coils are commonly wound onto a magnetizable core. To assist in the coil winding process, the magnetic core is often shaped to include a plurality of slots that are separated by radial teeth, or fingers. During assembly, a plurality of the conductive coils is packed within each slot in the magnetic core.

One well known version of a magnetic core used in rotating electric machines includes a plurality of radial teeth which are generally rectangular in transverse cross-section. Because the distance, or spacing, between the distal ends of adjacent teeth is roughly equal to the distance between the proximal ends of said teeth, the magnetic core is commonly referred to in the art as having an open slot design. As can be appreciated, an open slot design enables winding coils to be readily inserted into each slot along either a radial path (i.e., at a right angle relative to the longitudinal axis of the core) or an axial path (i.e., in parallel with the longitudinal axis of the core). Once packed within the slot, the coils are held fixed in place by wedging at least one non-conductive block (commonly referred to in the art as a slot stick or wedge) in the slot between the distal ends of the adjacent pair of teeth. In this manner, the coils are less susceptible to vibrate.

Although well-known in the art, a magnetic core which utilizes an open slot design suffers from a notable drawback. Specifically, it has been found that an open slot design can significantly compromise the overall performance of the machine (e.g., power efficiency). In particular, it has been found that electric machines which include a magnetic core with an open slot design often suffer from, among other things, significant increases in slot harmonics, magnetic flux leakage and cogging torque (i.e., vibration), which are all highly undesirable.

Accordingly, in order to improve performance of the machine, it is widely known in the art to reduce the spacing between the distal ends of adjacent teeth (this spacing being commonly referred to in the art as the slot gap). Specifically, the distal end of each radial tooth in a magnetic core is often provided with a tooth tip (also referred to in the art simply as a tip) which is substantially wider than the remainder of the tooth, thereby providing the magnetic core with a closed or semi-closed slot design. One well-known version of a tooth tip includes a pair of acute corners which are rough mirror images of one another. As such, the aforementioned tooth tip provides the distal end of a magnetic core tooth with the shape of an equilateral triangle with its apex removed therefrom.

As can be appreciated, widened tooth tips provide the magnetic core of an electric machine with the ideal configuration for magnetic purposes. Specifically, the magnetic lines of flux that conduct through the core are optimized so as to lower the effects of slot harmonics, magnetic flux leakage and cogging torque, which is highly desirable. Furthermore, it should be noted that widened tooth tips also provide support for the slot sticks, thereby reducing the mechanical stress exerted thereon.

Tooth tips of the type described in detail above are often integrally formed onto the distal end of each radial tooth. Although functionally beneficial for the reasons noted in detail above, it has been found that integral tooth tips introduce a notable shortcoming in connection with machine manufacture. Specifically, because integral tooth tips significantly reduce the slot gap between adjacent teeth, it has been found to be rather difficult, if not impossible, to insert magnetic coils into each slot along a radial path. Rather, winding coils can only be inserted into each slot along an axial path, thereby complicating the coil packing process, which is highly undesirable.

Accordingly, it is well known in the art for tooth tips of magnetizable material to be removably mounted onto the distal ends of magnetic core teeth. As can be appreciated, the ability to remove each tip from its corresponding tooth enables magnetic coils to be radially disposed within each slot, thereby facilitating the coil packing process, which is highly desirable.

In U.S. Pat. No. 6,611,076 to J. R. Lindbery et al. (hereinafter referred to as the '076 patent), there is disclosed a tooth tip for a high speed generator. The tooth tips, which fit over teeth shaped into the distal ends of fingers formed between slots in laminated disks making up a portion of a stator in a generator, (i) facilitate slipping stator windings into slots from a central opening in the laminated disks, (ii) cooperate with wedges to affix stator windings in the slots; and (iii) provide a slot gap between adjacent tooth tips which is substantially smaller than the width of the slots, thereby reducing slot harmonics and improving the performance of the generator.

Although well known in the art, removable tooth tips of the type described in the '076 patent suffer from a couple notable shortcomings.

As a first shortcoming, tooth tips of the type disclosed in the '076 patent have been found to experience both (i) a relatively high level of mechanical stress as a result of the relative sharpness of its cuts (i.e., angles of curvature) along its mating interface with the core tooth and (ii) a relatively weak connective force with the core tooth due to the limited contact area established therebetween. As a result, it is required that the tooth tip be manufactured out of a relatively strong material, such as steel, to preserve its mechanical integrity. Otherwise, the tooth tip is susceptible to either fragmentation or complete separation from the magnetic core tooth during operation of the machine. As can be appreciated, the requirement that each tip be constructed using strong materials limits machine manufacturers from considering weaker materials that are considerably less expensive, which is highly undesirable.

As a second shortcoming, tooth tips of the type disclosed in the '076 patent can only be mounted on magnetic core teeth along an axial path (i.e., parallel to the longitudinal axis of the core) and not along a radial path (i.e., at a right angle relative to the longitudinal axis of the core). Consequently, if the winding coils (and wedge) are packed too tightly within a slot, axial installation of the tip on the magnetic core tooth can not be readily achieved. To the contrary, if the tip could be installed along a radial path, the tip itself could be used to impart an inward force on the winding coils to render them more compact. As a result of this limitation, the assembly of electric machines using removable tips of the type described in the '076 patent typically requires that least one tip be mounted on a tooth before packing the copper coils (and wedge) within its adjacent slot (i.e., to help retain the coils within the slot). As can be appreciated, this rearrangement of the steps of assembly substantially reduces the maximum number (i.e., density or slot fill percentage) of coils that can be packed within each slot which, in turn, limits the performance characteristics of the machine, which is highly undesirable.

SUMMARY OF THE INVENTION

It is an object of the present invention to provide a new and improved attachment for a magnetic structure used in rotating electric machines, the magnetic structure being shaped to include a plurality of coil-retaining slots that are separated by radial teeth.

It another object of the present invention to provide an attachment of the type described above which can be removably mounted on the distal end of a radial tooth.

It is yet another object of the present invention to provide an attachment of the type described above which reduces the slot gap between adjacent pairs of magnetic teeth and, as a result, provide the magnetic structure with the ideal configuration for magnetic purposes.

It is still another object of the present invention to provide an attachment of the type described above which can be mounted on a radial tooth along either an axial or radial path relative to the longitudinal axis of the magnetic structure.

It is yet still another object of the present invention to provide an attachment of the type described above which is configured to exhibit a relatively low level of mechanical stress.

It is another object of the present invention to provide an attachment of the type described above which is configured to maximize the area of contact with the radial tooth on which it is mounted.

It is yet another object of the present invention to provide an attachment of the type described above which is durable, has a limited number of parts, is inexpensive to manufacture and is easy to install.

Accordingly, there is provided an attachment for a magnetic structure used in rotating electric machines, the magnetic structure being shaped to define a pair of slots which are separated by an elongated tooth, the elongated tooth having a pair of sidewalls and a distal end, the distal end of the tooth being shaped to define a recess, the attachment comprising (a) a base, the base comprising a bottom wall, a top wall and a pair of opposing sidewalls, and (b) a stem formed on the top wall of the base and projecting outward therefrom, the stem being dimensioned for fitted insertion within the recess in the elongated tooth.

Various other features and advantages will appear from the description to follow. In the description, reference is made to the accompanying drawings which form a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Construction of Stator 11

Figure 1:
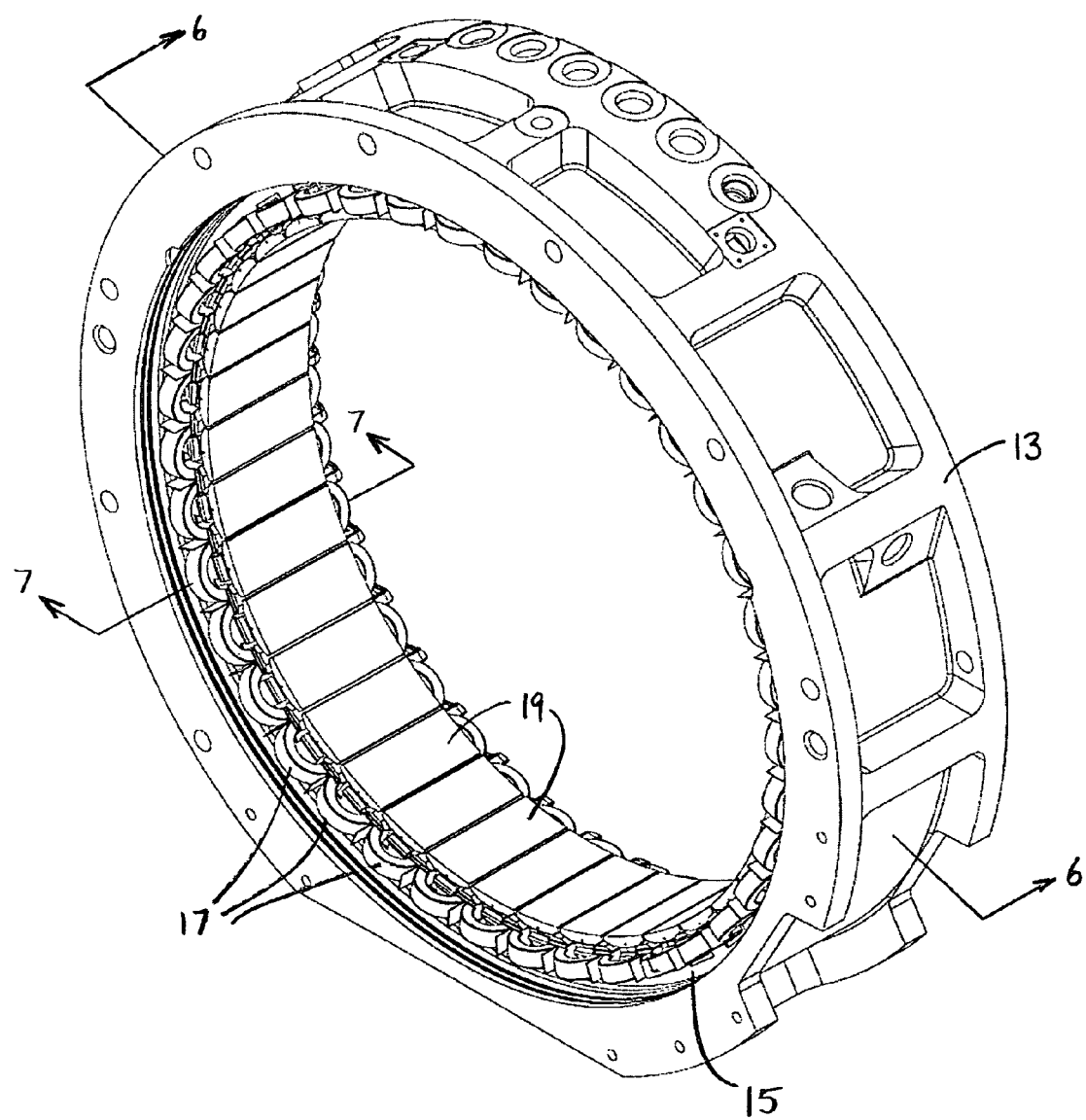
FIG. 1 is a perspective view of a stator for a rotating electric machine, the stator being constructed according to the teachings of the present invention.
Figure 2:
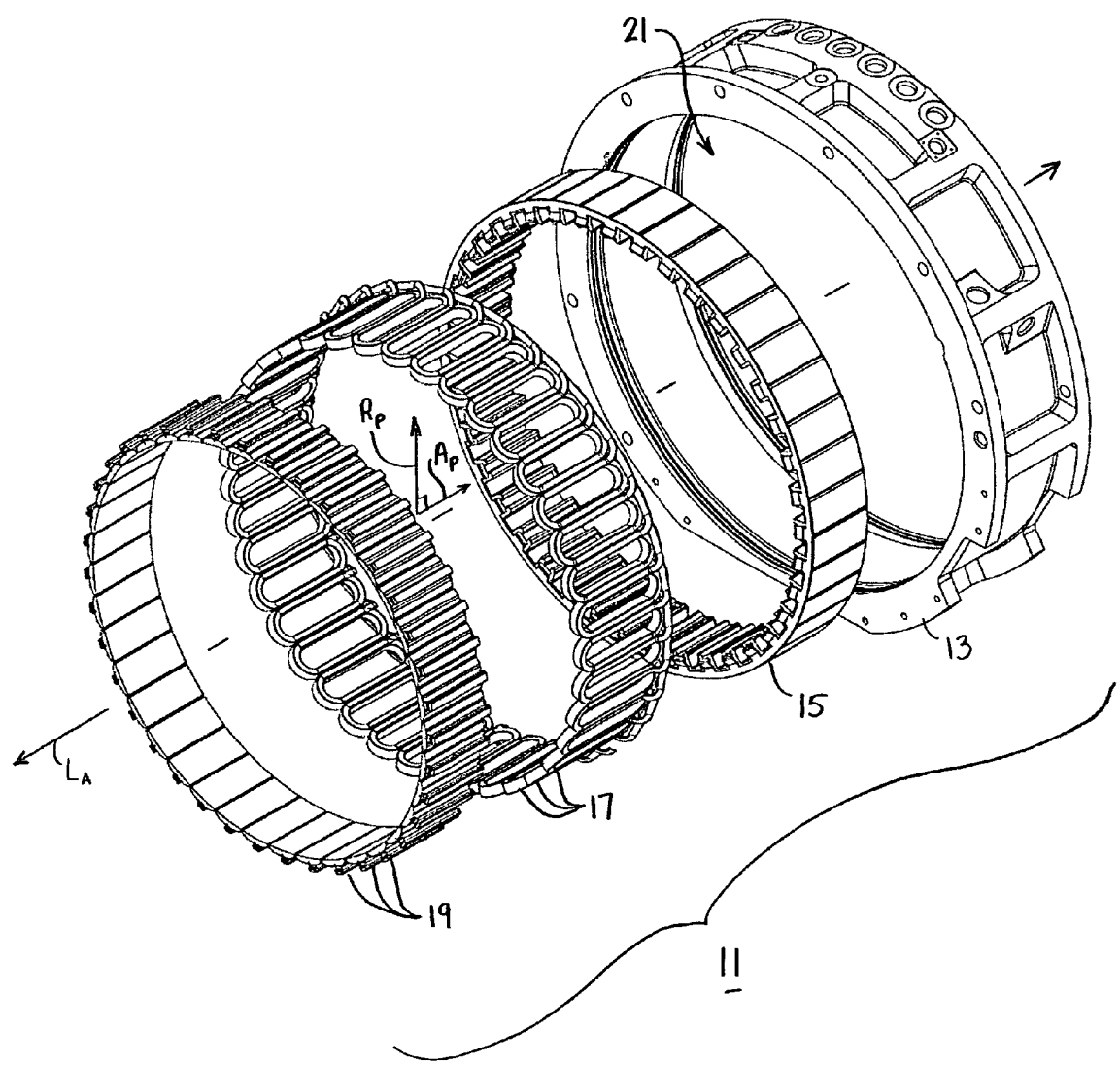
FIG. 2 is an exploded, perspective view of the stator shown in FIG. 1.

Referring now to FIGS. 1 and 2, there are shown perspective and exploded perspective views, respectively, of a stator for a rotating electric machine, the stator being constructed according to the teachings of the present invention and identified generally herein by reference numeral 11.

Stator 11 comprises an outer frame 13, a magnetic core 15 held within frame 13, a plurality of magnetic coils 17 packed within slots formed in magnetic core 15, and a plurality of conductive attachments, or tips, 19 which matingly engage with magnetic core 15 to both (i) optimize the magnetic lines of flux that conduct through core 15 and (ii) assist in retaining coils 17 in place. As will be described in detail below, the particular design of the mating interface between magnetic core 15 and tips 19 serves as the principal novel feature of the present invention.

As seen most clearly in FIG. 2, outer frame, or back iron, 13 is a rigid and durable member which is shaped to define a central opening 21 that is generally circular in transverse cross-section. Preferably, the diameter of central opening 21 is dimensioned to fittingly receive magnetic core 15. In this manner, frame 13 serves as a structural support for magnetic core 15, as will be described further below.

Figure 3A:
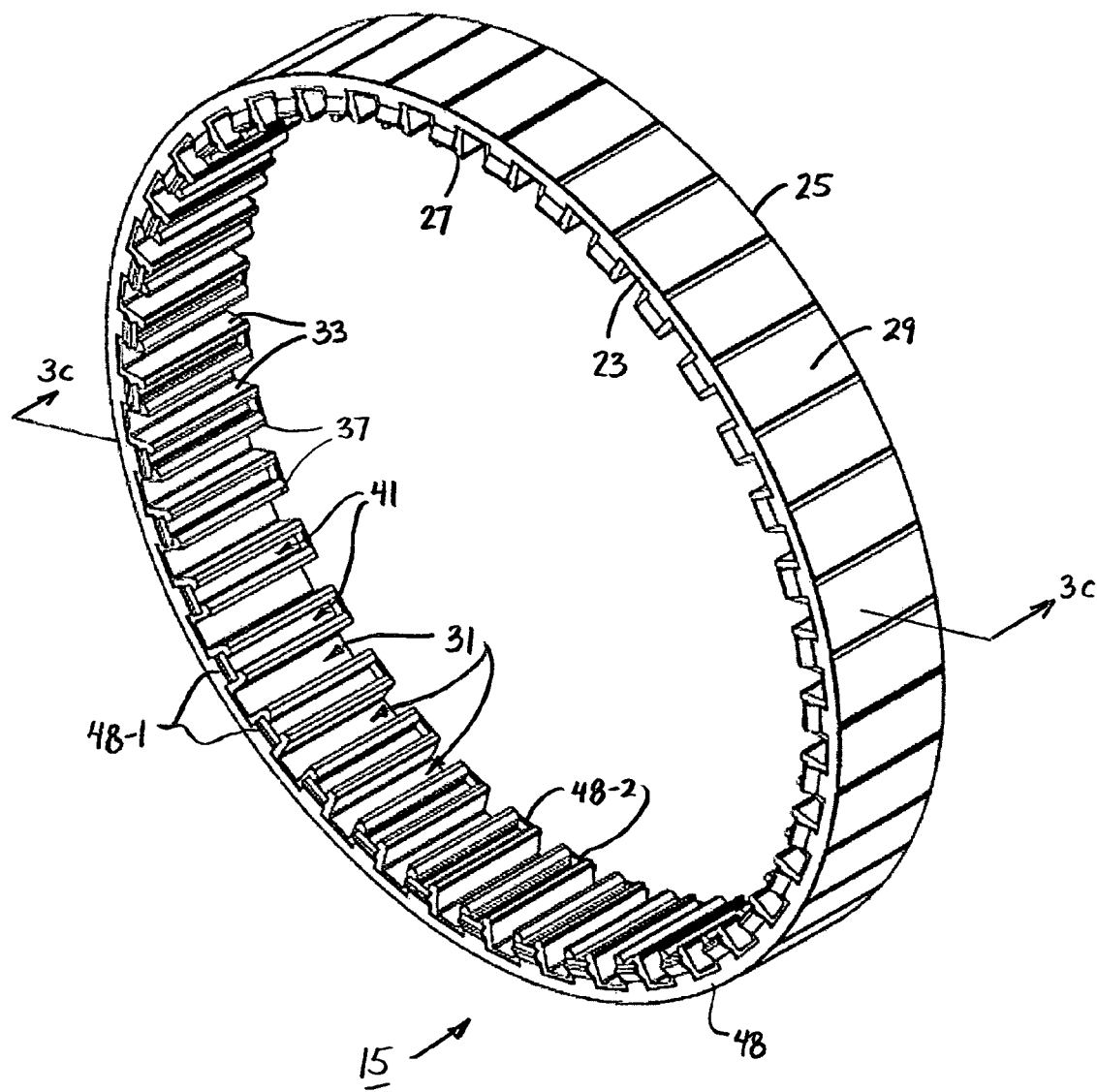
FIG. 3(a) is an enlarged, perspective view of the magnetic core shown in FIG. 2.
Figure 3B:
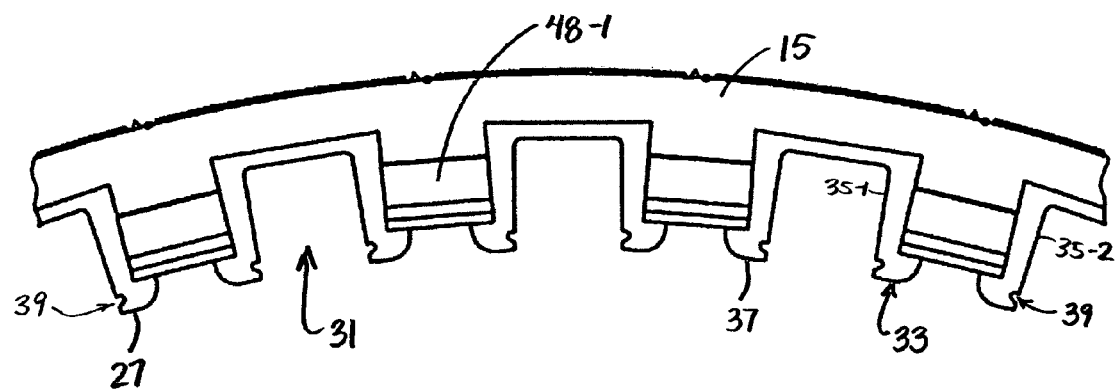
FIG. 3(b) is an enlarged, fragmentary, left end view of the magnetic core shown in FIG. 3(a)
Figure 3C:
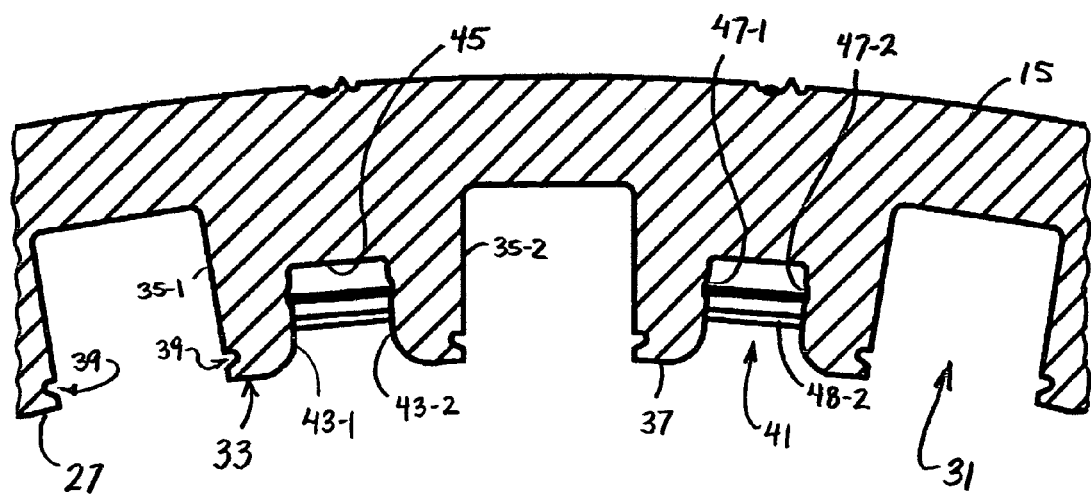
FIG. 3(c) is an enlarged, fragmentary, section view of the magnetic core shown in FIG. 3(a) taken along lines 3c-3c.

Referring now to FIGS. 3(a)-3(c), magnetic core 15 (also referred to herein as magnetic structure 15) is represented herein as an enlarged, continuous ring that is constructed from metal, such as iron or steel, and which includes a flat front surface 23, a flat rear surface 25, an inner surface 27 and an outer surface 29. Preferably, magnetic structure 15 is constructed from a plurality of thin, disk-shaped laminates that are stacked front-to-back upon one another, the plurality of laminates being held uniformly together in a stack by outer frame 13.

It should be noted that, as defined herein, use of the term "magnetic core" represents any magnetic structure that is shaped to define a plurality of coil-retaining slots which are separated by radial teeth. In this capacity, it is to be understood the principles of the present invention could be readily applied to either stator cores or rotor cores without departing from the spirit of the present invention.

A plurality of equidistantly spaced slots 31 project radially into inner surface 27 of magnetic core 15, each slot 31 having a generally rectangular configuration in transverse cross-section. As will be described further in detail below, each slot 31 is dimensioned to fittingly receive a portion of an adjacent pair of magnetic coils 17.

Each adjacent pair of slots 31 is separated by a radial tooth, or finger, 33 that is integrally formed in magnetic core 15. Each tooth 33 is generally rectangular in transverse cross-section and includes a pair of outer sidewalls 35-1 and 35-2 and a distal end wall 37. A semi-circular notch 39 is formed in each of outer sidewalls 35 in proximity to distal end wall 37, each notch 39 extending the length of tooth 33 in a linear manner. As will be described further below, each notch 39 is sized and shaped to receive a corner, or tip, of a wedge that is used to retain coils 17 within slots 31.

A longitudinal recess 41 is formed in distal end wall 37 of each tooth 33, recess 41 projecting radially into distal end wall 37 and extending the entire length of tooth 33. As will be described further below, each recess 41 is dimensioned to fittingly receive a complementary portion of tooth tip 19 and, as such, serves as the female component of the mating interface between each tip 19 and magnetic core 15.

As seen most clearly in FIG. 3(c), recess 41 is generally square-shaped in transverse cross-section and includes a pair of opposing inner sidewalls 43-1 and 43-2 and an intermediate wall 45. A pair of shallow grooves 47-1 and 47-2 are formed into inner sidewalls 43-1 and 43-2, respectively, and extend the length of tooth 33, the function of grooves 47 to be described further in detail below.

A unitary retention plate 48 is shown coupled to core 15, retention plate 48 comprising a first set of spring-biased retention fingers 48-1 which is positioned along front surface 23 of core 15 and a second set of spring-biased retention fingers 48-2 which is positioned along rear surface 25 of core 15. Each of fingers 48-1 and 48-2 is preferably located at one end of a corresponding tooth 33. Accordingly, retention plate 48 is adapted to latch onto opposing ends of each corresponding tip 19, thereby reinforcing the strength of the connection established between tips 19 and core 15, as will be described further in detail below. However, it is to be understood that the inclusion of retention plate 48 is optional and, as such, could be removed from stator 11 without departing from the spirit of the present invention.

Figure 4A:
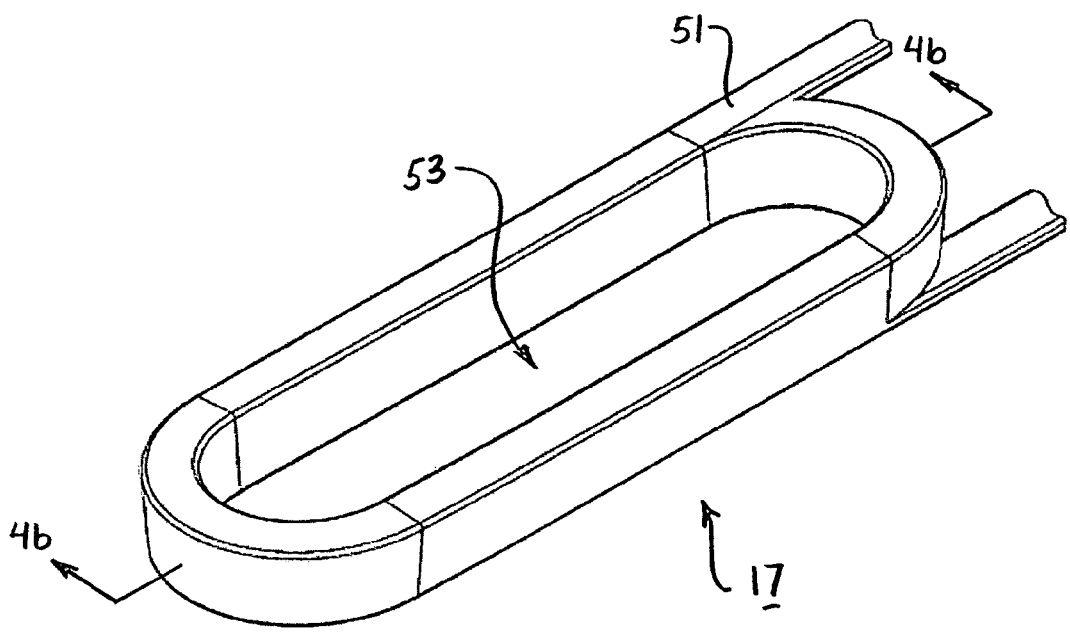
FIG. 4(a) is an enlarged, fragmentary, perspective view of a coil shown in FIG. 2.
Figure 4B:
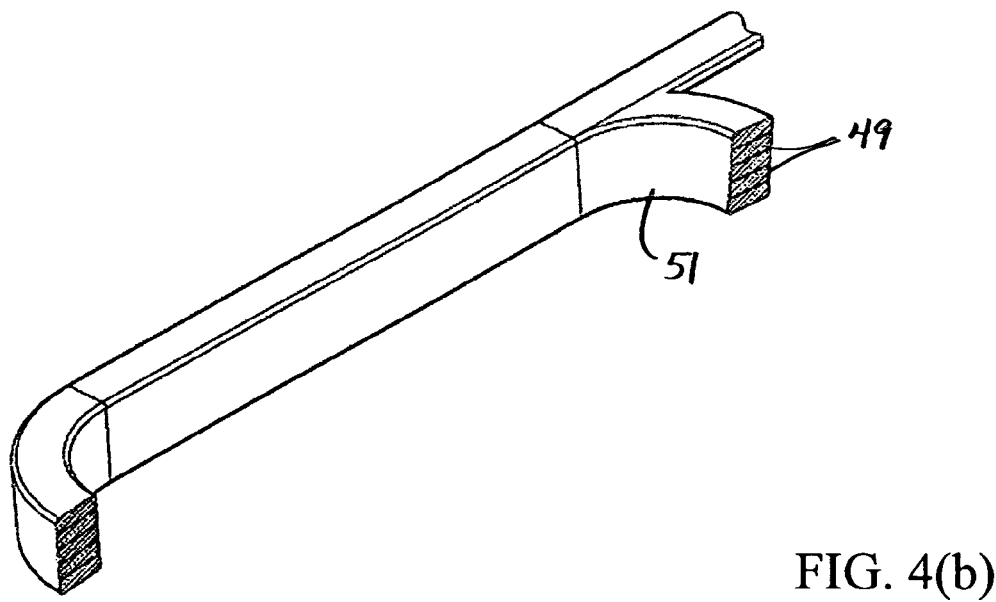
FIG. 4(b) is a section view of the coil shown in FIG. 4(a) taken along lines 4b-4b.

Referring now to FIGS. 4(a) and 4(b), each magnetic coil 17 is represented herein as comprising a set of copper windings, or bars, 49 which are disposed within a unitary, insulated housing 51. In this manner, housing 51 prevents the individual copper windings 49 from potentially shorting upon contact with metallic core 15.

Insulated housing 51 is shown as having a generally oval rectangular configuration that is shaped to define an enlarged central opening 53. Accordingly, each coil 17 is mounted on a corresponding tooth 33 in magnetic core 15 such that tooth 33 projects through central opening 53. In this manner, it is to be understood that windings 49 within housing 51 pack within slot 31 in magnetic structure 15.

It should be noted that stator 11 is not limited to the particular construction of magnetic coils 17 as shown herein. Rather, it is to be understood that alternative means for disposing a plurality of individual magnetic windings within slots 31 could be implemented in stator 11 without departing from the spirit of the present invention.

Figure 5A:
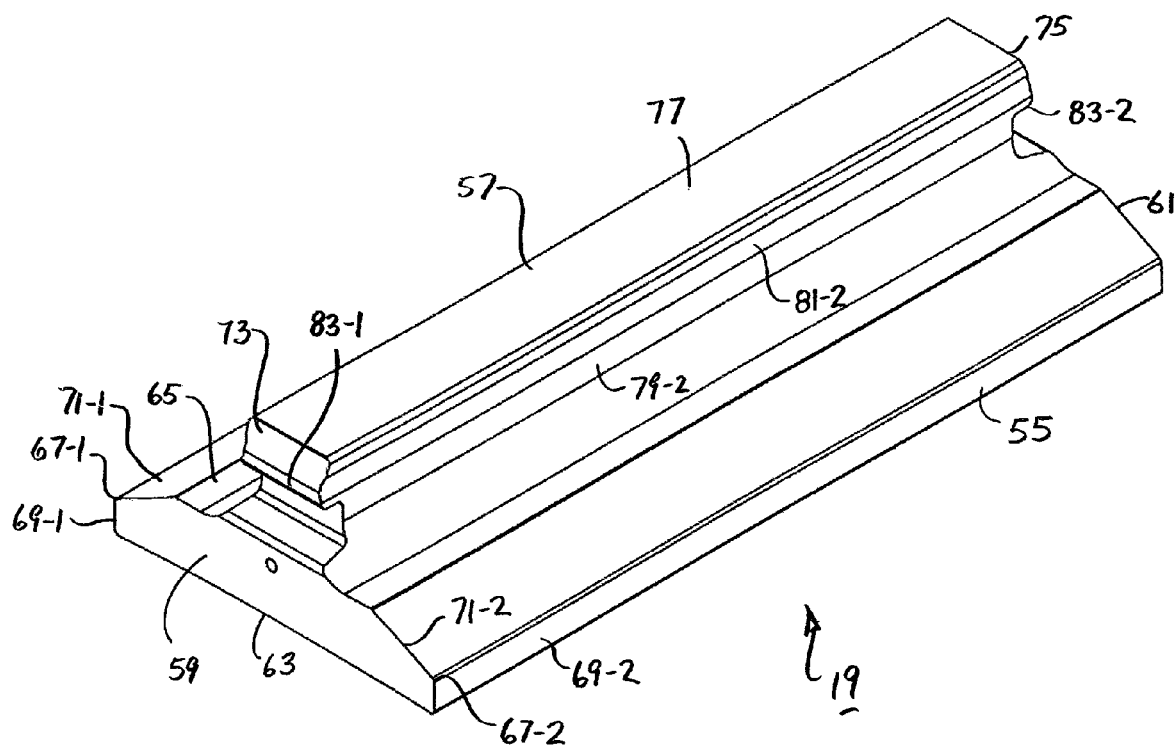
FIGS. 5(a)-(c) are enlarged perspective, left end plan and front plan views, respectively, of an attachment shown in FIG. 2.
Figure 5B:
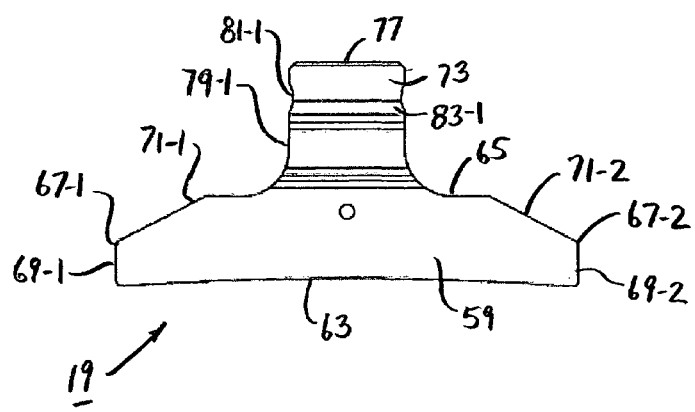
Figure 5C:
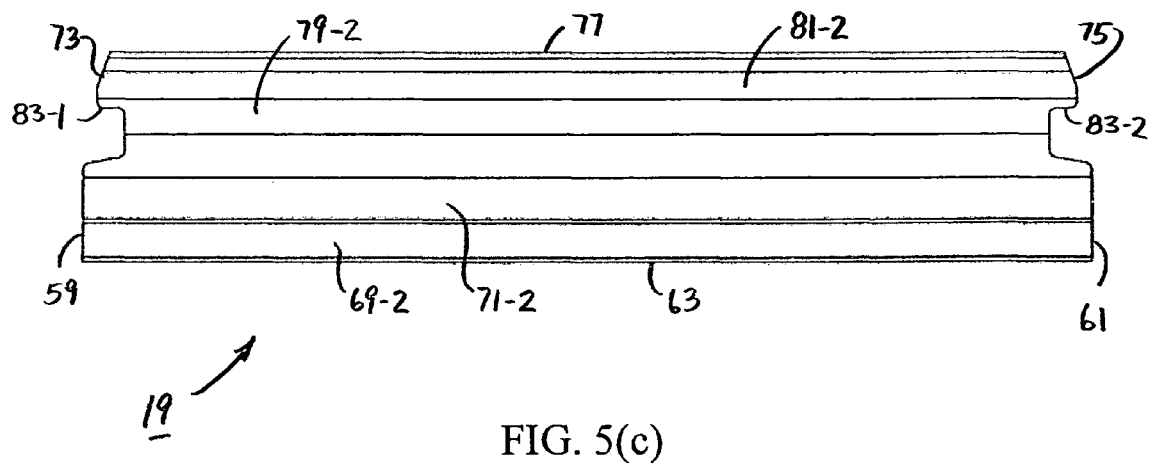

Referring now to FIGS. 5(a)-(c), each attachment, or tooth tip, 19 is formed as a unitary member which includes a base 55 and a stem 57. As can be appreciated, each tip 19 is constructed of a conductive material, such as laminated steel or powdered iron, and is shaped to optimize the magnetic lines of flux that conduct through core 15.

Base 55 of each tip 19 comprises a front wall 59, a rear wall 61, a widened bottom wall 63, a narrowed top wall 65 and a pair of opposing sidewalls 67-1 and 67-2. Each sidewall 67 is represented herein as comprising a pair of non-planar surfaces. Specifically, sidewall 67-1 includes first and second surfaces 69-1 and 71-1 and sidewall 67-2 includes first and second surfaces 69-2 and 71-2. In this manner, base 55 assumes a generally semi-octagonal shape in transverse cross-section. However, it is to be understood that each sidewall 67 could be alternatively formed as a planar surface (i.e., providing base 55 with a semi-hexagonal shape in transverse cross-section) without departing from the spirit of the present invention.

It should be noted that bottom wall 63 is preferably provided with a slight degree of curvature, as seen most clearly in FIG. 5(b). As a result, with attachments 19 properly mounted on corresponding teeth 33 in core 15, the collection of convex bottom walls 63 together defines a nearly continuous, cylindrical surface which defines the central opening in stator 11.

Stem 57 is integrally formed onto top wall 65 of base 55 and projects orthogonally away therefrom. Stem 57 is formed as an elongated, longitudinal block which extends nearly the entire length of base 55. As will be described further below, stem 57 functions as a key (i.e., male connective interface) which is dimensioned for fitted insertion within recess 41 in tooth 33 (i.e., the complementary female connective interface).

Stem 57 includes a front end 73, a rear end 75, a flattened top wall 77 and a pair of opposing sidewalls 79-1 and 79-2 which together provide stem 57 with a generally square shape in transverse cross-section, as seen most clearly in FIG. 5(b).

Shallow, longitudinal grooves 81-1 and 81-2 are formed into sidewalls 79-1 and 79-2, respectively. Each groove 81 extends the length of stem 57 and is generally semi-circular, or semi-oval, in lateral cross-section. As seen most clearly in FIG. 6, grooves 81-1 and 81-2 in stem 57 are sized and shaped to align as mirror images with corresponding grooves 47-1 and 47-2, respectively, in tooth 33 when tip 19 is properly connected to magnetic core 15. In this manner, each complementary pair of grooves 47 and 81 together define a keyway which is dimensioned to receive a unitary, generally cylindrical locking member, such as an elongated rod which, in turn, assists in retain tip 19 attached to core 15, as will be described further in detail below.

Figure 7:
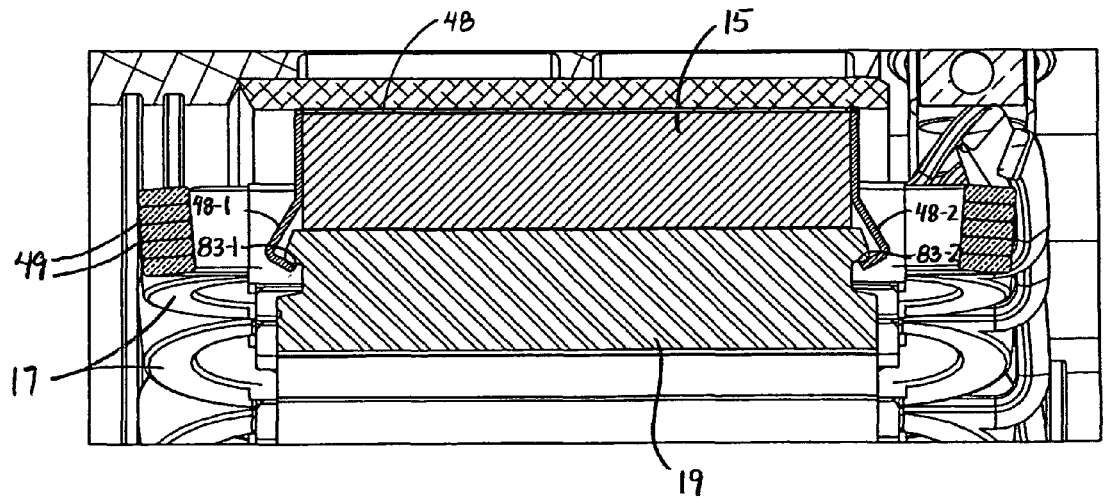
FIG. 7 is an enlarged, fragmentary, section view of the stator shown in FIG. 1, taken along lines 7-7.

As seen most clearly in FIG. 5(c), front end 73 of stem 57 is shaped to define an outwardly projecting shoulder 83-1. Similarly, rear end 75 of stem 57 is shaped to define an outwardly projecting shoulder 83-2. Referring now to FIG. 7, it is to be understood that, with stator 11 fully assembled, each deflectable, generally L-shaped finger 48-1 on retention plate 48 is biased to latch onto the underside of front shoulder 83-1 and each deflectable, generally L-shaped finger 48-2 on retention plate 48 is similarly biased to latch onto the underside of rear shoulder 83-2. In this manner, plate 48 serves to reinforce the strength of the connection established between each attachment 19 and magnetic core 15, which is highly desirable.

Method of Assembling Stator 11

Stator 11 is preferably assembled in the following manner. Specifically, with laminated core 15 retained within frame 13, magnetic coils 17 are mounted on core 15. Specifically, each magnetic coil 17 is mounted on core 15 such that one tooth 33 fittingly protrudes through the opening 53 of a corresponding coil 17. In this manner, windings 49 in coil 17 are packed tightly within each slot 31 in core 15.

Figure 6:
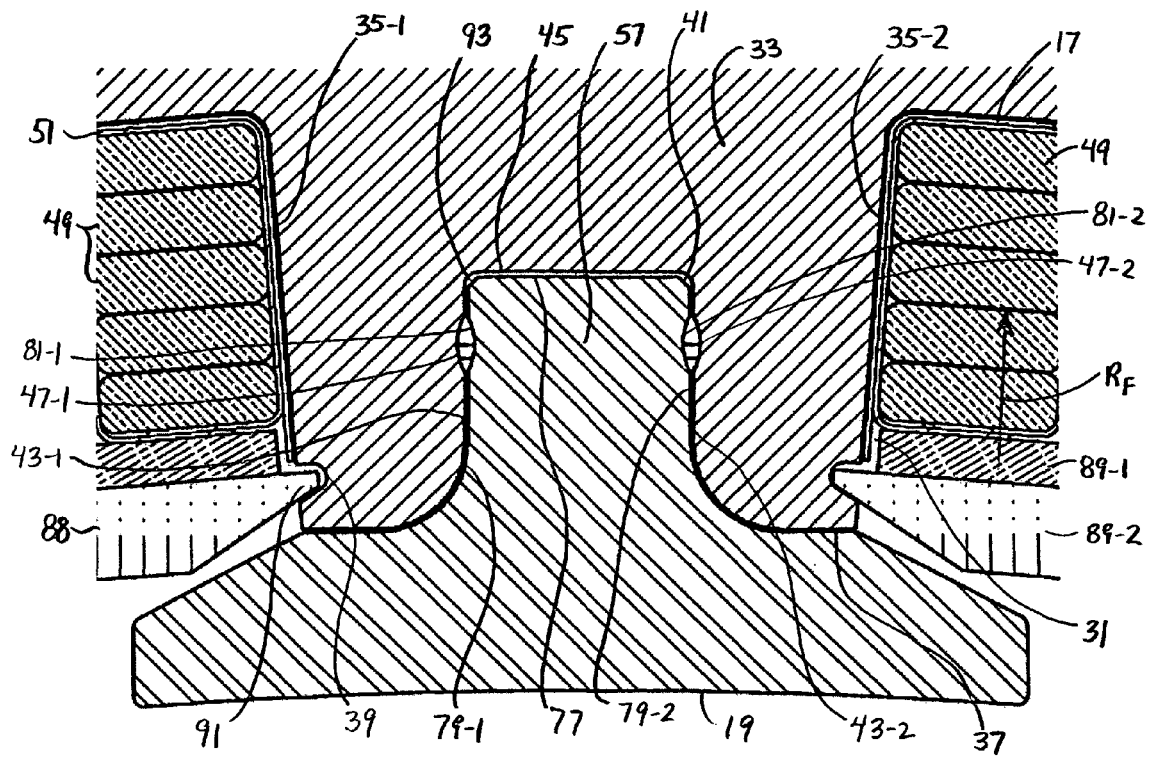
FIG. 6 is an enlarged, fragmentary, section view of the stator shown in FIG. 1, taken along lines 6-6.

Referring now to FIG. 6, with windings 49 packed tightly within each slot 31 in core 15, a non-conductive block 88 is disposed within each slot 31 to retain coils 17 in place. As can be seen, each block 88 preferably includes a rectangular portion 89-1 which applies a radial force $R_F$ onto coil 17 and a trapezoidal portion 89-2 which engages opposing sidewalls 35 of adjacent teeth 33 in core 15. Specifically, trapezoidal portion 89-2 is shaped to include a pair of corners 91 which outwardly protrude in opposing directions. Each corner 91 in block 88 is dimensioned to fittingly project into a corresponding notch 39 in tooth 33. By engaging tooth 33 in this manner, block 88 is held firmly in place within slot 31, thereby retaining coils 17 on core 15, which is highly desirable.

With blocks 88 disposed as such, the plurality of individual attachments 19 are coupled to magnetic structure 15. Specifically, stem 57 of each tip 19 is inserted into recess 41 of a corresponding tooth 33. As will be described further below, the design of the interface between each tip 19 and tooth 33 enables each tip 19 to be installed in either a radial or axial path relative to the longitudinal axis of core 15, which is highly desirable.

With each tip 19 properly mounted on core 15, it is to be understood that grooves 81-1 and 81-2 in stem 57 align with grooves 47-1 and 47-2, respectively, in tooth 33. Each complementary pairs of grooves 47 and 81 together define a opening, or keyway, which is generally circular in transverse cross-section. Accordingly, it is to be understood that a locking member (not shown) in the form of an elongated rod or other similarly shaped item can be axially disposed therethrough in a fitted manner to help retain tip 19 in place within slot 31. The remainder of the junction between tip 19 and tooth 33 (or, if the aforementioned locking members are not utilized, the entirety of the junction between tip 19 and the tooth 33) is preferably filled with a suitable bonding material 93, such as a resin or deformable compound, to strengthen the connection between each tip 19 and associated tooth 33.

Notable Benefits and Further Applications Associated with Tips 19

The design of the interface between each attachment 19 and its associated tooth 33 provides stator 11 with a number of notable advantages.

As a first benefit, the area of contact established between each attachment 19 and its associated tooth 33 is maximized, thereby strengthening the connection established therebetween, which is highly desirable. In fact, because the area of contact extends radially into each tooth 33, it should be noted that the strength of the connection between each tip 19 and tooth 33 could be further increased, if necessary, by increasing both (i) the depth of recess 41 in tooth 33 and (ii) the height of stem 57. In this manner, the strength of the tooth tip connection can be increased without enlarging the overall footprint of the joined tip 19 and tooth 33, which is highly desirable.

As a second benefit, the cuts between planar surfaces in each attachment 19 are relatively gradual in nature. Because attachments 19 do not include any sharp cuts (i.e., sharp angles) between planar surfaces, the mechanical stress concentrations experienced by tips 19 are minimized, which is highly desirable.

In view of the two aforementioned benefits, it is envisioned that each tip 19 could be effectively manufactured using a wide variety of different materials. To the contrary, conventional tips which experience both a high level of mechanical stress and a weak connective force with magnetic core teeth can only be manufactured from a strong, conductive material, such as steel. Accordingly, it is to be understood that the particular material utilized to construct tips 19 could be selected based upon (i) the intended application for stator 11 and (ii) manufacturing costs, rather than its strength. As a consequence, it is envisioned that tip 19 could be constructed using, among other things, either a rigid laminated steel or a weaker (i.e., more brittle), less expensive, magnetic composite (e.g., insulated powered iron).

As a third benefit, the interface between each tip 19 and its corresponding tooth 33 enables tip 19 to be installed along either (i) an axial path $A_P$ relative to the longitudinal axis $L_A$ of core 15 or (ii) a radial path $R_P$ relative to the longitudinal axis $L_A$ of core 15, as shown in FIG. 2. To the contrary, tips of the type disclosed in the '076 patent can only be installed along an axial path. Accordingly, it should be noted that tips 19 that are installed onto teeth 33 along a radial path $R_P$ are able to impart a compressive force onto coils 17 and non-conductive blocks 88 disposed within slots 31. As a result, the ability to radially install tips 19 enables a higher density of copper windings 49 to be packed within each slot 31, which is a principal object of the present invention.

The embodiment shown in the present invention is intended to be merely exemplary and those skilled in the art shall be able to make numerous variations and modifications to it without departing from the spirit of the present invention. All such variations and modifications are intended to be within the scope of the present invention as defined in the appended claims.

For example, it should be noted that tips 19 need not be limited for use with the particular style stator shown herein. Rather, it is to be understood that tips 19 could be used in conjunction with alternative types of stators (e.g., a planar stator in a linear electric machine) without departing from the spirit of the present invention. In fact, as mentioned in detail above, it is envisioned that any well known style of magnetic structure used in rotating electric machines (e.g., a rotor core) that is shaped to define a plurality of coil-retaining slots separated by radial teeth could be modified, as deemed necessary, to receive tips 19 without departing from the spirit of the present invention.

What is claimed is:

1. An attachment for a magnetic structure used in rotating electric machines, the magnetic structure being shaped to define a pair of coil-retaining slots which are separated by an elongated tooth, the elongated tooth having a pair of sidewalls and a distal end, the distal end of the tooth being shaped to define a recess, the attachment comprising:
    (a) a base, the base comprising a bottom wall, a top wall and a pair of opposing sidewalls, and
    (b) a stem formed on the top wall of the base and projecting outward therefrom, the stem being dimensioned for fitted insertion within the recess in the elongated tooth, the stem including a flattened top wall and a pair of opposing planar sidewalls, each of the pair of opposing planar sidewalls extending from the flattened top wall of the stem to the top wall of the base,
    (c) wherein a longitudinal groove is formed into at least one of the pair of opposing planar sidewalls of the stem.

2. The attachment as claimed in claim 1 wherein each of the pair of opposing sidewalls in the base comprises first and second non-planar surfaces.

3. The attachment as claimed in claim 1 wherein the bottom wall in the base is curved.

4. The attachment as claimed in claim 1 wherein a longitudinal groove is formed into each of the pair of opposing sidewalls of the stem.

5. The attachment as claimed in claim 4 wherein each longitudinal groove extends the length of the stem.

6. The attachment as claimed in claim 4 wherein at least one of the front and rear ends of the stem is shaped to define an outwardly projecting shoulder.

7. The attachment as claimed in claim 1 wherein the attachment is constructed as a unitary member.

8. The attachment as claimed in claim 7 wherein the attachment is constructed of laminated steel.

9. The attachment as claimed in claim 7 wherein the attachment is constructed of an insulated powdered iron.

10. The combination of:
    (a) a magnetic structure for a rotating electric machine, the magnetic structure being shaped to define a plurality of slots, each adjacent pair of slots being separated by an elongated tooth, each elongated tooth having a pair of sidewalls and a distal end, the distal end of each tooth being shaped to define a recess;
    (b) a plurality of magnetic coils disposed within the slots in the magnetic structure; and
    (c) a plurality of attachments, each of the plurality of attachments being coupled to a corresponding tooth in the magnetic structure, each attachment comprising,
        (i) a base, the base comprising a bottom wall, a top wall and a pair of opposing sidewalls, and
        (ii) a stem formed on the top wall of the base and projecting outward therefrom, the stem being dimensioned for fitted insertion within the recess in the elongated tooth to which the attachment is coupled, the stem including a flattened top wall and a pair of opposing planar sidewalls, each of the pair of opposing planar sidewalls extending from the flattened top wall of the stem to the top wall of the base,
        (iii) wherein a longitudinal groove is formed into at least one of the pair of opposing planar sidewalls of the stem.

11. The combination as claimed in claim 10 wherein each of the plurality of magnetic coils is wrapped around a corresponding elongated tooth in the magnetic structure.

12. The combination as claimed in claim 10 wherein each of the pair of opposing sidewalls in the base of each attachment comprises first and second non-planar surfaces.

13. The combination as claimed in claim 10 wherein the bottom wall in the base of each attachment is curved.

14. The combination as claimed in claim 10 wherein a longitudinal groove is formed into each of the pair of opposing sidewalls of the stem for each attachment.

15. The combination as claimed in claim 14 wherein each longitudinal groove extends the length of the stem for each attachment.

16. The combination as claimed in claim 10 wherein a longitudinal groove is formed into at least one sidewall of each elongated tooth in the magnetic structure.

17. The combination as claimed in claim 16 wherein, with each attachment coupled to a corresponding tooth, the longitudinal groove formed in each attachment aligns with the longitudinal groove formed in its corresponding elongated tooth.

* * * * *